(12) United States Patent
Lee et al.

(10) Patent No.: US 6,405,320 B1
(45) Date of Patent: Jun. 11, 2002

(54) COMPUTER SYSTEM PERFORMING MACHINE SPECIFIC TASKS BEFORE GOING TO A LOW POWER STATE

(75) Inventors: Woon Jeong Lee; Lan Wang, both of Singapore (SG)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/189,225

(22) Filed: Nov. 11, 1998

(30) Foreign Application Priority Data

Jul. 7, 1998 (SG) ............................................. 9801732

(51) Int. Cl.⁷ .............................. G06F 1/26; G06F 1/28; G06F 1/30
(52) U.S. Cl. ........................ 713/300; 713/323; 713/324; 327/276
(58) Field of Search ............................... 713/300, 323, 713/324, 340, 400; 327/276

(56) References Cited

U.S. PATENT DOCUMENTS

| | | | | |
|---|---|---|---|---|
| 5,287,525 A | * | 2/1994 | Lum et al. ................... 395/750 |
| 5,461,266 A | * | 10/1995 | Koreeda et al. ............ 307/105 |
| 5,469,553 A | * | 11/1995 | Patrick ....................... 713/323 |
| 5,564,015 A | * | 10/1996 | Bunnell ........................ 714/47 |
| 5,692,204 A | * | 11/1997 | Rawson et al. ............. 713/340 |
| 5,717,353 A | * | 2/1998 | Fujimoto .................... 327/276 |
| 5,784,628 A | * | 7/1998 | Reneris ................. 395/750.01 |
| 5,878,264 A | * | 3/1999 | Ebrahim ...................... 713/323 |
| 5,935,252 A | * | 8/1999 | Berglund et al. ........... 713/300 |
| 5,944,831 A | * | 8/1999 | Pate et al. ................... 713/324 |
| 5,960,207 A | * | 9/1999 | Brown .................. 395/750.01 |
| 5,983,354 A | * | 11/1999 | Poisner et al. .............. 713/320 |
| 5,996,078 A | * | 11/1999 | Christensen et al. ........ 713/300 |
| 6,038,671 A | * | 3/2000 | Tran et al. ................... 713/300 |
| 6,057,739 A | * | 5/2000 | Crowley et al. .............. 331/14 |

OTHER PUBLICATIONS

Advanced Configuration and Power Interface Specification, Intel/Microsoft/Toshiba, Revision 1.0, Dec. 22, 1996, 275 pages.

* cited by examiner

Primary Examiner—David Wiley
Assistant Examiner—Frantz B. Jean
(74) Attorney, Agent, or Firm—Akin, Gump, Strauss, Hauer & Feld, LLP

(57) ABSTRACT

A computer system having an Advance Configuration and Power Interface-compliant, or ACPI, operating system performs certain machine specific tasks before going to a low power state. When the computer operating system indicates that entry into the low power state is desired, a microcontroller embedded in an input/output chip is alerted. Synchronization between the main processor of the computer system and the embedded microcontroller of the ACPI operating system is achieved, reducing the likelihood of system failure on the next boot operation. The embedded microcontroller then also causes the state of devices connected to the input/output chip to be saved. This helps the machine to go to a known state during the resume process.

18 Claims, 7 Drawing Sheets

PM1a, PM1b CONTROL REGISTER

| BIT 15;14 | BIT 13 | BIT 12-10 | BIT 9-3 | BIT 2 | BIT 1 | BIT 0 |
|---|---|---|---|---|---|---|
| Reserved | Suspend Enable Bit SUS_EN | Suspend Type Field SUS_TYP | Reserved | Global Release Bit | Bus Mater Reload Enable Bit | SCI Enable Bit SCI_EN |

*FIG. 4*

COMPUTER SYSTEM PERFORMING MACHINE SPECIFIC TASKS BEFORE GOING TO A LOW POWER STATE

BACKGROUND OF THE INVENTION

1. Field of the Invention

The present invention relates to computer systems, and more specifically to ones having an advance configuration and power interface, or ACPI, operating system.

2. Background of the Related Art

The Advanced Configuration and Power Interface (ACPI) has been developed for power management in computer systems. The ACPI has been intended to replace earlier power management techniques, including both the plug-and-play (PnP) and the Advanced Power Management (APM), and has been said to virtually eliminate the need for a system Basic Input/Output System (BIOS) to configure a computer system. The ACPI operating system was thus planned to perform all of the functions previously performed by plug-and-play (PnP) and the Advanced Power Management (APM), reducing the system Basic Input Output System to a small collection of routines callable from the operating system.

With ACPI, it was determined to relegate to the operating system various functions that had previously been performed by the system Basic Input Output System or BIOS. Traditionally when power has been applied to a computer system, its Basic Input Output System executed immediately. The BIOS for the computer system typically resided in ROM or PROM (and was therefore difficult to modify) or in an Initial Program Load (IPL) device that could not be disabled.

The BIOS for the computer system has, so far as is known, included firmware that configured the computer system, and provided a variety of other functions. In addition to the computer system BIOS, there were often other, separate Basic Input Output Systems contained in the power management software techniques. In many PnP and APM systems, following the execution of the computer system BIOS, both a Plug-and-Play BIOS and an Advanced Power Management BIOS, each with related utilities, executed. The Plug-and-Play BIOS was separate from that of the computer system, and reconfigured the system either dynamically or statically to allow the operating system to initialize.

The Advanced Power Management controlled system power, including sleep states and power states. The Advanced Power Management BIOS was also separate from both that of the computer system BIOS and the PnP BIOS. ACPI has begun to replace both the Plug-and-Play BIOS and Advanced Power Management BIOS, and other system initialization functionality. This has been done by providing operating systems and a platform/device interface that can perform these tasks in a more centralized manner. However, to function properly, ACPI also required compliance of platform hardware. Thus, certain ACPI compatible hardware interface requirements have been imposed on computer manufacturers, so that all devices would be compatible with the ACPI compatible operating systems. Thus, from the perspective of the manufacturer, the ACPI specification may be considered as a hardware interface specification.

One of the most significant advances of ACPI has been the ability of the operating system to control system power states. Before ACPI, power management had been platform-specific, typically implemented in hardware or in the computer system BIOS code. ACPI has allowed portable, platform or independent operating systems to control hardware power states on a system-wide basis. ACPI defined a number of low-power states in which the operating system could place the computer system.

The ACPI specification required certain hardware components and extensions to facilitate the hardware interface. Typically an embedded microcontroller was one of these hardware components. This embedded microcontroller was in effect a stand-alone processor working hand-in-hand with the main processor of the computer system. One of the other additional hardware extensions necessary under the ACPI specification has been that of power-management registers. The power-management registers controlled the power state of the computer system. An ACPI-compatible operating system running on the processor of the computer system wrote instructions defining a power state for at least some of these registers. The ACPI compliant operating system controlled a variety of system-wide features, such as enabling and disabling interrupt sources, controlling the amount of power provided to various buses and devices, and restoring the computer system from low power states, such as sleep-mode and soft-off mode. For example, if the operating system desired to put the computer system in a sleep mode, the operating system wrote a "prepare to sleep" command to the registers. The operating system then issued an enable for certain of the registers. The issued enable set an appropriate enable bit corresponding to the register. When the "prepare to sleep" instruction was sent and the registers were enabled, the computer system transitioned to whatever low-power state the operating system commanded.

Unfortunately, even if the main processor was ACPI-compliant, the embedded processor might not be. With respect to the embedded controller, its state was that of the device in which it was embedded, not that of the computer system. Sleep states were not entered or exited with well defined synchronization of multiple processors, particularly since the embedded controller has, so far as is known, been connected to a "general purpose event" status register bit.

SUMMARY OF THE INVENTION

Briefly, the present invention provides a new and improved computer system to perform machine specific tasks before going to a low power state. The computer system has a host processor under control of an operating system, preferably one according to the advance configuration and power interface, or ACPI, allowing the operating state and at least one low power or sleep state. The computer system also has at least one device containing a microprocessor which normally runs independently of the host processor. When the host processor receives a command to transition to a low power state, the microcontroller is notified. The microcontroller can then also transition to the lower power state, or it may shut down. At this time, the system can perform custodial or housekeeping functions, causing devices in the system to save their present states. Thus, the host processor and microprocessor are synchronized. Also, on restart the computer system can return at a known state.

BRIEF DESCRIPTION OF THE DRAWINGS

A better understanding of the present invention can be obtained when the following detailed description of the preferred embodiment is considered in conjunction with the following drawings, in which:

FIG. 4 is a schematic diagram of certain power management control registers in the computer system of FIG. 3.

DETAILED DESCRIPTION OF THE PREFERRED EMBODIMENT

Figure 1:
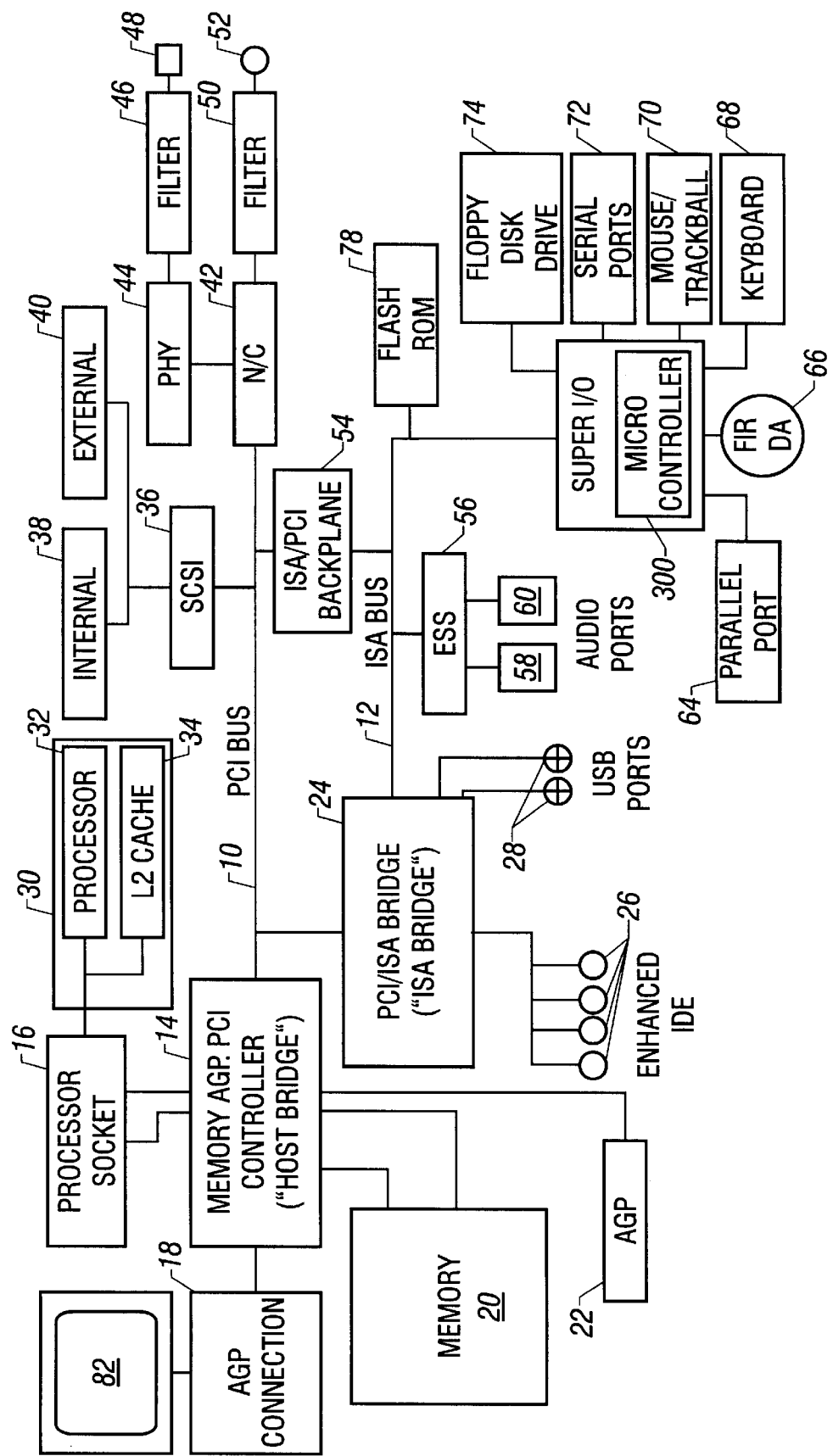
FIG. 1 is a schematic diagram of a computer system according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, a memory subsystem 20, and an AGP 22. Although not required, typically an AGP connector 18 may also be provided in the computer system S for connection of a video display 18. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the host bridge 14 includes interface circuitry for the AGP connector 18 (when present), the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers 224, an 8254 timer, a real time clock (RTC) with a 256 byte complementary metal oxide semiconductor (CMOS) 222 (FIG. 2), static RAM (SRAM) and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan$^{TN}$ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a Standard Microsystem Corporation SMC952 device. This Super I/O chip 62 provides a variety of input/output functionality, including a parallel port 64, an infrared port 66, a keyboard controller for a keyboard 68, a port for a mouse or track ball 70, additional series ports 72, and a floppy disk drive controller for a floppy disk drive 74. These devices are coupled through connectors to the Super I/O 62.

Figure 3:
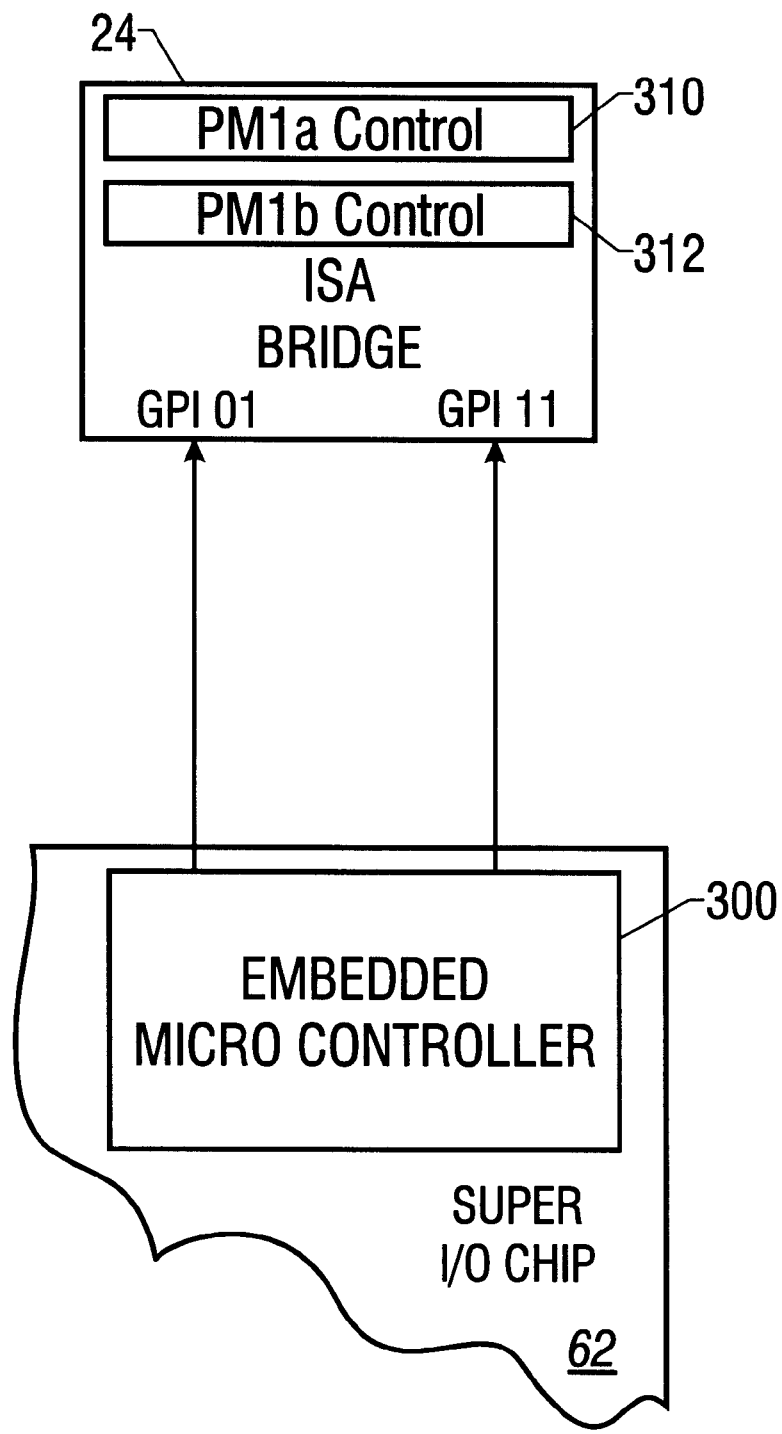
FIG. 3 is a more detailed schematic diagram of certain portions, including an embedded microcontroller.

According to the present invention, the super I/O 62 includes an embedded microcontroller 300 (FIGS. 1 and 3) which is preferably an SMC 951 available from Standard Microsystem Corporation. As will be described below, the embedded microcontroller 30 provides runtime event signals and wakeup event signals on receipt of certain indications which occur during operation of the computer system S.

The ISA bus 12 is also coupled through bus transceivers 76 to a flash ROM 78, which can include both basic input/output system, such as BIOS 216 (FIG. 2) code for execution by the processor 32, as well as an additional code for execution by microcontrollers in a ROM-sharing arrangement.

The Super I/O chip provides a variety.of miscellaneous functions for the system which includes security features, system power control, light emitting diode (LED) control, remote wake up logic, system fan control hood lock control and support, system temperature control, and various glue logic.

Finally, a video display 82 can be coupled to the AGP connector 18 for display of data by the computer system S. The video display 82 displays video and graphics data provided by a video display process running on either the processor module 30 or another by a PCI device bus master or PCI bridge device bus master via host bridge 14. Video or graphics data may be stored in main memory or in a supplementary or extension memory module. Again, it should be understood that a wide variety of systems could be used instead of the disclosed system S without detracting from the spirit of the invention.

Figure 2:
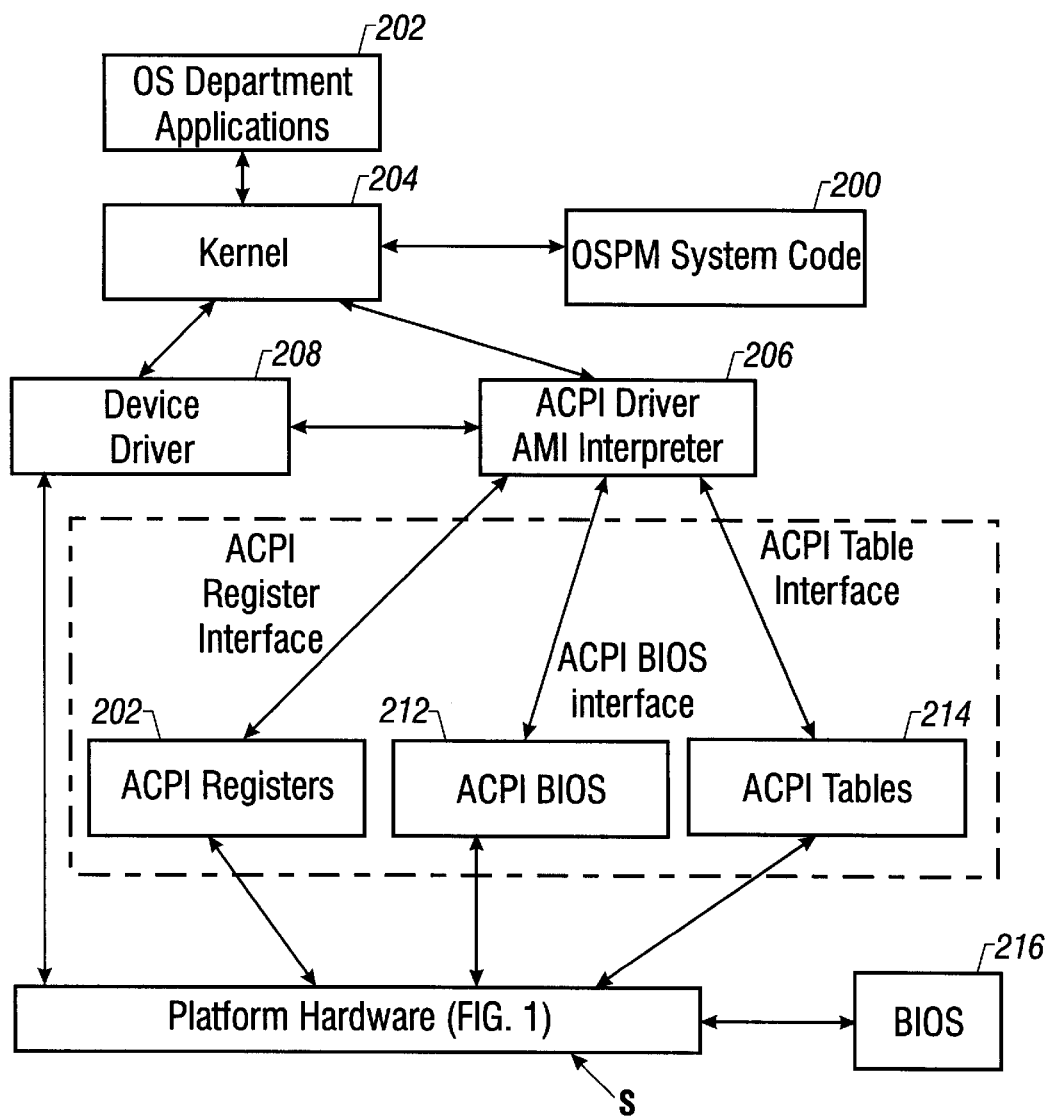
FIG. 2 is a schematic diagram of the advance configuration and power interface, or ACPI, operating system, including its operating system directed power management, for the computer system of FIG. 1.

Referring now to FIG. 2, a schematic diagram of the computer system S of FIG. 1 in an ACPI environment is shown. The computer system S of FIG. 1 is configured according to what is known as the ACPI Global System, including the operating system directed power management (OSPM) 200, as is shown. Various operating system dependent software applications 202, run on a system interface, through a kernel 204 with the operating system directed power management system code 200, and with an ACPI driver/machine language interpreter 206. Conventionally this occurs according to a virtual machine language, compiled from ACPI Source Language, in which device control methods are written, and which is understandable to all ACPI-compatible operating systems. The device control methods are typically written by device manufacturers and provided to platform developers and manufacturers.

The operating system directed power management system code 200 and ACPI driver/machine language interpreter 206 operate in software within the microprocessor 30, and are operating system specific. The kernel 204 also interfaces with a device driver 208, also running in software on the microprocessor 30. Through the ACPI driver/machine language interpreter 206, the software of system code 200 interfaces with ACPI registers 210, the ACPI Basic Input Output System 212, and the ACPI tables 214, to the platform hardware (FIG. 1) and, through the platform hardware of FIG. 1, to the computer system BIOS 216. The ACPI registers 210, ACPI BIOS 212 and ACPI Tables 214 are independent of operating system technologies, interfaces, code and hardware.

The computer system BIOS 216 is typically that associated with the Advanced Power Management and/or PnP. ACPI BIOS is part of computer system BIOS.

The device driver 208 also allows conventional, standard register interfaces directly with the platform hardware of the computer system S (FIG. 1). The ACPI tables 214 describe the interface to the platform hardware. Although some controls are typically imbedded in fixed blocks of ACPI registers 214, the ACPI tables 214 specify the addresses of the register blocks. When the operating system 200 executes, the ACPI tables 218 can be accessed.

The ACPI operating environment shown in FIG. 2 migrates much of the functionality previously accomplished in computer system hardware of FIG. 1 and its system BIOS 216 into the overall operating system illustrated. Nevertheless, the operating system 200 operates in a hardware-independent mode. Thus, interrupts and many other hardware signals are mapped to software-readable ACPI registers 214 according to the Advanced Configuration Power Interface specification, so that whatever ACPI-aware operating system has control may detect signals to appropriate portions of the computer system of FIG. 1.

As a result, general hardware ports exist within the input/output space of the host computer system. The operating system 200 and other software running on the host processor 30 reads ACPI registers 214 in the port space as though from a memory location. Flexibility of system layout is retained by the platform manufacturer, since ACPI-compliant systems create a data structure object in memory for each device in the system, containing any drivers or parameters useful to the host system in operating the device.

The ACPI specification defines various power states for the computer system S, and for various devices within the computer system S. Devices may be placed in different power states as needed. For example, ACPI compliant portions of the computer system S may operate when in a "S0" or normal-operate state, but are completely shut down and without power when in a "S3" state. There is also an S4 state for ACPI-compliant portions of the computer system S, described below.

In an S1 or S2 state, the hardware platform of the computer systsem S is in a low power state, referred to as "sleep" state respectfully, in which very little processing is performed. Such states are particularly useful in mobile or portable computer systems, since power consumption is a dominant concern. Intermediate power states such a S1, S2 or S3 allow the computer system S to respond to particular interrupts, such as a remote access request, a telephone call, or a user pressing a key on a keyboard, without requiring the power needs of a fully-operating system.

Similarly, devices have various power states in an ACPI environment. Devices may be placed in a fully-operational "D0" state, a low power or "Device Off" state referred to as "D3" state, or either of two vendor-defined intermediate states known as "D1" and "D2." Some devices are known as "waking" devices. A waking device is a device capable of generating an interrupt that can cause the computer system to transition from a very low power state such as the S4 state to a fully operational S0 state.

ACPI defines a system S4 state for ACPI-Compliant portions of the system S. The S4 state is an extremely low power state for a computer system. The behavior of the S4 state is defined such that processors are not executing instructions. Devices capable of waking the system from the D4 state are initialized and enabled for transitioning the system to state S0. A transition from S4 to S0 causes the processor 30 to begin execution at its boot location.

The S4 sleeping state is the lowest power, longest wakeup latency sleeping state supported by ACPI. The ACPI-compliant device portions of system S are disabled from power, and yet maintained in platform context. The mechanism initiated by the operating system for entry into the S4 state requires the operating system driver to write "sleep type" fields and set the "sleep enable" bit. These are defined for ACPI-complaint systems. The mechanism initiated by BIOS 216 for entry into the S4 state requires the operating system to transfer control to the BIOS 216 according to the ACPI specification for ACPI-compliant hardware platforms. These values are specified in ACPI Tables 218 defined for ACPI systems. When the BIOS 216 has control appropriate memory and chip set context are saved, the platform is placed in the S4 state and power is disabled to all devices, and appropriate values are written to the appropriate wake status registers according to the ACPI specification.

The embedded microcontroller 300 (FIG. 3) on super I/O chip 62 in the computer system S provides run time event signals on line 302 to a general purpose input on the ISA bridge 24. When the ISA bridge 24 is a PIIX4 bridge, the run time event signals are furnished to General Purpose Input 01. Similarly, the embedded microcontroller 300 provides wakeup event signals on line 304 to a general purpose input on the ISA bridge 24. In the case of the PIIX4 bridge, the wakeup event signals are furnished to General Purpose Input 11.

The embedded microcontroller 300 toggles or changes state of the runtime event signal on line 302 to ISA bridge 24 on occurrence of the following events:

1. In the event of a power resource change (i.e., from AC to DC or DC to AC).
2. On the insertion or removal of a battery from power supply to the computer system S.
3. On occurrence of a thermal event, i.e., a sensing is made that the computer system S is running at too high a temperature and the operating system needs to be notified to take appropriate corrective action.
4. On the insertion or removal of a device in the computer system S, such as a floppy disk in disk drive 74.

The embedded microcontroller 300 also toggles or changes state of the wakeup signal on line 304 to ISA bridge 24 on the occurrence of one of the following events:

1. The sleep button is pressed by the user on keyboard 68 so that the computer system S is to be placed into a sleep state.
2. The sleep button is depressed on keyboard 68 to indicate that the user desires to wakeup the computer system S.
3. A low threshold level is detected in the battery for the computer system S so that the embedded controller 300 needs to wake up the computer system S and ask the operating system to perform appropriate power conservation or saving strategies.
4. A PCMCIA adapter card is either being inserted or removed from the PCMCIA slot, such as for disk drive 74, in the computer system S.

According to the ACPI Specification, included among the ACPI registers 210 are a power management or PM1$a$ control register 310 and a power management or PM1$b$ control register 312. When the ISA bridge 24 is a PIIX4 bridge, PM1$a$ control register 310 is accessible on Input/Output port 2004 and PM1$b$ control register 312 is accessible on Input/Output port 5004. For other types of computer systems and ISA bridges, the PM1$a$ and PM1$b$ control registers may be located at other appropriate locations in the computer system S. Each of the PM1$a$ and PM1$b$ control registers 310 and 312 are configured as shown in FIG. 4. Bit 0 is the SCI enable or SCI_EN bit. Bit 1 is the Bus Master Reload Enable bit. Bit 2 is the Global Release bit. Bits 3 through 9 are reserved. Bits 10 through 12 define the suspend type or SUS_TYP field to be described below. Bit 13 is the Suspend Enable bit or SUS_EN while bits 14 and 15 and reserved.

For the PIIX4 bridge 24 in the disclosed embodiment, bits 12–10 of the SUS_TYP field are defined as follows:

| Bits 12–10 | Definition |
|---|---|
| 000 | Soft OFF or suspend to disk |
| 001 | Suspend to RAM (STR) |
| 010 | POSCL (Powered On Suspend, Context Lost) |
| 011 | POSCCL (Powered On Suspend, CPU Context Lost) |
| 100 | POS (Powered On Suspend, Context Maintained) |
| 101 | Working (clock control) |
| 110 | Reserved |
| 111 | Reserved |

Figure 5:
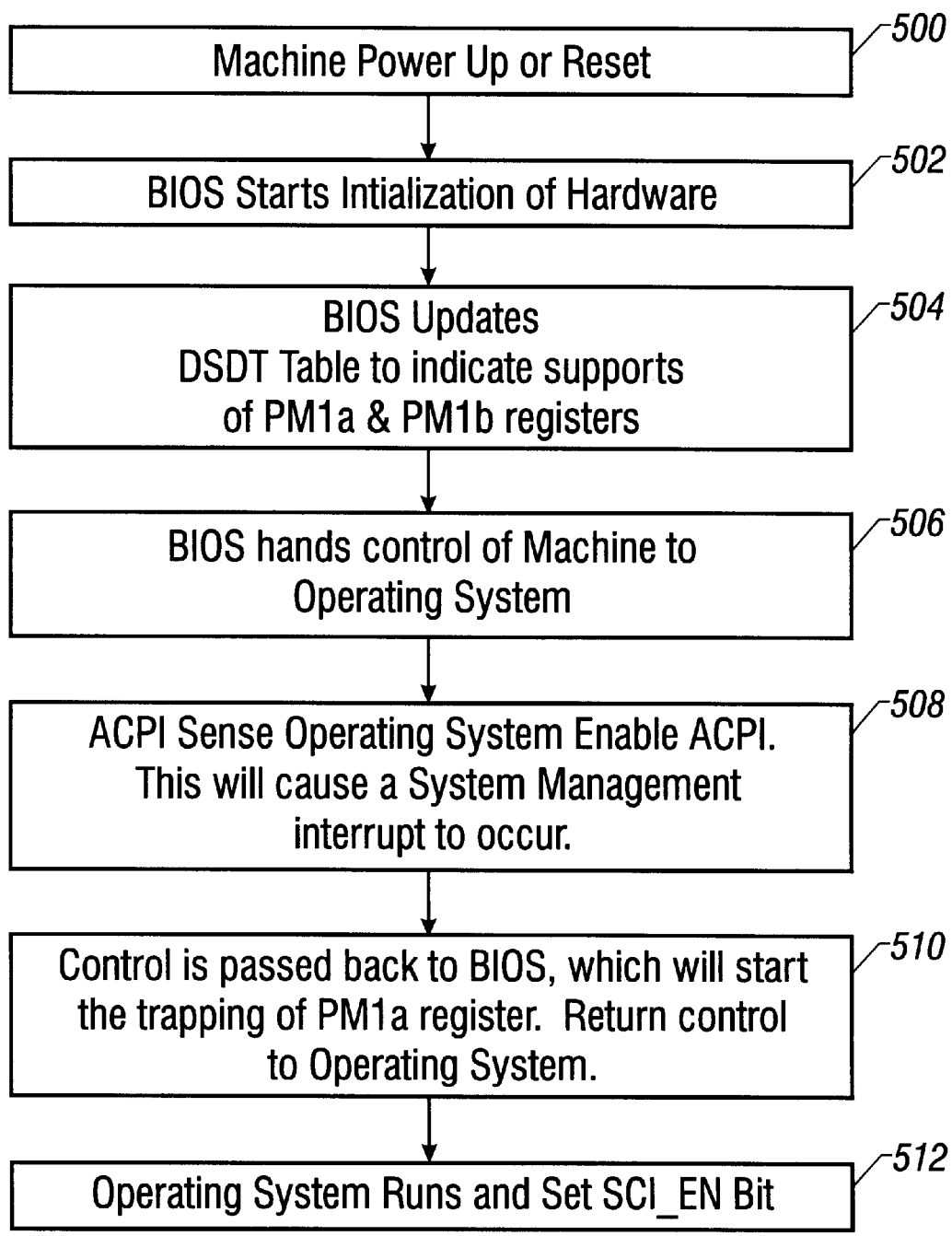
FIGS. 5, 6A and 6B are flow charts: of the operation of a computer system according to the present invention.

FIG. 5 of the drawings illustrates the steps performed during the initialization process of the computer system S according to the present invention. During a step 500, the computer system S receives an indication of power up or reset and control is transferred to a step 502 where the BIOS 216 begins initialization of the platform hardware S. Control is then transferred to step 504 where the BIOS updates the DSDT table to indicate support of power management control registers PM1$a$ and PM1$b$, or registers 310 and 312 of FIG. 3. Control is then transferred to step 506 where the BIOS 216 transfers control of the computer system S to the OSPM code 200.

Operation of the computer system S :continues in the normal manner until the ACPI operating system is notified of an Operating System Enable. This causes a System Management Interrupt to occur. Control is then transferred to step 510 which transfers control of the computer system S back to the BIOS 216. At this point, the BIOS 216 begins trapping of the PM1$a$ register 310 to be described below with reference to FIG. 6. It should be understood, however, that the trapping function performed during step 510 can also be enabled during the performance of step 504 set forth above. After the performance of step 510, control is transferred back to the operating system 200. Then, during a step 512, the operating system 200 begins to run, setting the SCI_EN bit 0 in control registers 310 and 312. The computer system S then operates in its normal manner according to the operating system 200 until the occurrence of either a run time event or a wakeup event as indicated by an appropriate signal to ISA bridge 24, as described above with reference to FIG. 3.

Figure 6A:
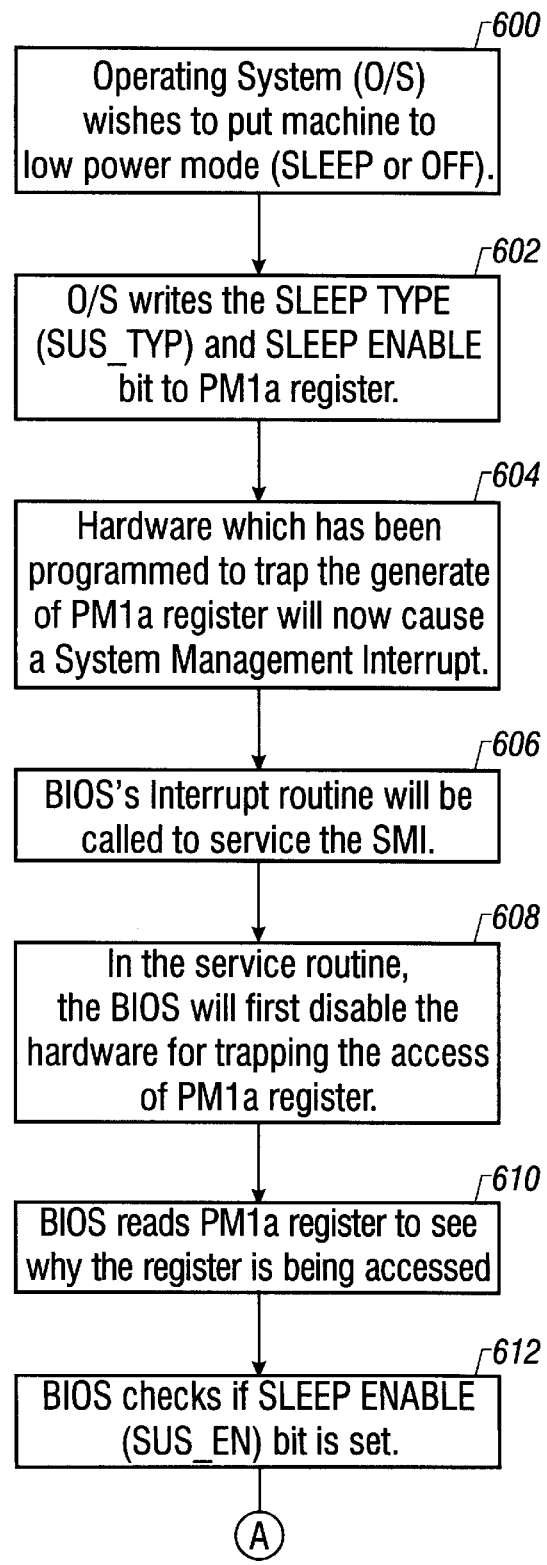
Figure 6B:
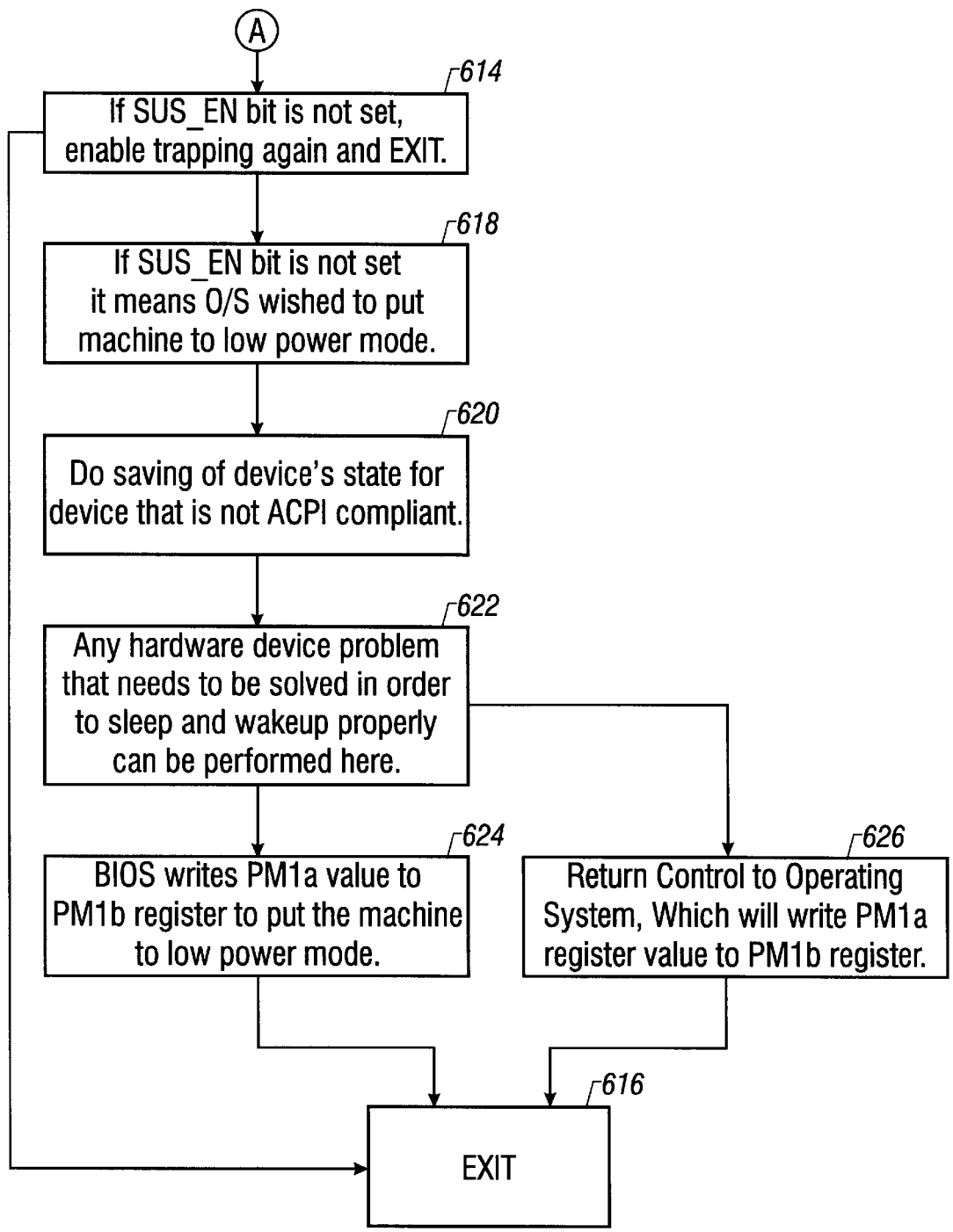

Turning to FIGS. 6A and 6B, the process of performing machine specific tasks before the ACPI operating system 212 according to the present invention is depicted. This occurs to put the computer system S to a lower power state. At step 600 an indication is received that the operating system 200 wishes to place the computer system S into a lower power mode, either sleep or off. Control is then transferred to step 602 where the ACPI Operating System ACPI Driver 206 writes the sleep type (SUS_TYPE) and the Sleep Enable Bit to PM1$a$ register 310. Control is then transferred to step 604 which causes the hardware which has been programmed to trap access of the PM1$a$ register 310 to now generate a System Management Interrupt.

Next, during a step 606 the interrupt routine of the ACPI BIOS 212 is called to service the System Management Interrupt generated during step 604. Control is then transferred to step 608 where the BIOS 212 disables the hardware for trapping access of the PM1$a$ register 310. Control is then transferred to step 610 and BIOS 212 reads the SUS_TYP field to see why PM1$a$ register 310 is being accessed. Next, step 612 assumes control to check if the sleep enable (SUS_EN) bit is set. Control is transferred to step 614 (FIG. 6B) and if the SUS_EN bit is not set, trapping is again enabled and control is transferred to an EXIT instruction 616.

If, however, during step 614 it is determined that the SUS_EN bit is set, the operating system has indicated a desire to put the computer system S to a lower power mode, as determined during step 618. Control is thus transferred to step 620. During step 620, the various devices in the computer system S that are not ACPI compliant have their present state stored in an appropriate register memory location.

Control is then transferred to step 622 so that any hardware device problem that needs to be solved in order to place the computer system in either the sleep or wakeup state properly can be performed. After performance of step 622, the BIOS 212 writes the value of the signal communicated to PM1$a$ register 310 into PM1$b$ register 312. The computer system S is then put in the lower power node during a step 624. Alternatively, step 626 can be performed and control of the computer system S transferred back to the operating system 200 to cause transfer or writing of the contents of PM1$a$ register 310 values to be written to PM1$b$ register 312 under control of the operating system 200. After performance of either step 624 or 626, control is transferred to an exit instruction 616.

In the operation of the present invention, changing the computer system S from one power-state to another is generally a function commanded by the operating system 200. Under ACPI, the operating system determines, either upon a software signal such as from an application 202 (FIG. 2) running on the host processor module 30 (FIG. 1), or upon a hardware signal that power is to be disabled from the computer system S.

Hardware-generated power state transitions include, for example, power button, sleep button, power override button sequence, real-time clock alarm, lid switch, thermal control AC adapter, and docking of devices. Also, sleep/wake control logic, legacy/ACPI select, and various power control logic can generate power-state transition commands. These typically conform to fixed feature programming models, although some may be generic events, and reside on the host system.

The operating system 200 responds by providing a "prepare to sleep" signal including of a suspend enable (SUS_EN) field and a type (SUS_TYP) to all devices in the computer system S, indicating a command to enter a low power state and the particular low power state, respectively. The devices respond by performing custodial or "housekeeping" functions as necessary. Housekeeping functions typically include storing context data in nonvolatile memory; unloading applications, closing files; recording or storing clock program counter and various timer states; and enabling "wake enabled" devices.

Briefly, the present invention allows ACPI to be extended to define power management for processors outside the ACPI space as well as processors within the ACPI space. This is accomplished by using the PM1b control register 312 to cover the power management state of embedded microcontroller 300. The techniques described above may also be extended to other embedded controllers in a non-ACPI processor, or otherwise not defined within the ACPI space of the system.

According to the present invention, regardless of the operating system, both the PM1a and PM1b control registers 310 and 312 are declared upon initial configuration. The _PM1b control register 312 is driven by the PM1a control register 310, and "traps" or detects signals to the PM1a control register and transactions accordingly. BIOS 230 (1) traps on every access to the PM1a control register, (2) checks the reason for the operating system access of the register, and (3): when the corresponding enable bit is set, indicates to the microcontroller 300 to shut down or enter a low power mode. Thus, an exchange of information between the various processors is accomplished before entering the low-power state. Both the PM1a and the PM1b control registers are placed in the appropriate state and the microcontroller 300 is given a signal in response to the ACPI defined "Prepare-to-Sleep" command. The microcontroller 300 returns an acknowledge, where upon the operating system writes the same sleep command to the PM1b control register 312, shutting down or putting to sleep the host processor 30.

Declaring both the PM1a and PM1b registers 310 and 312, and providing the microcontroller 300 with a chance to either shut down or enter a low power mode whenever the operating system or BIOS 230 accesses the PM1a control register 310, provides several advantages. Primarily, synchronization is achieved between the main processor 30 and the microcontroller 300. Also, timing information can be exchanged over the interface bus 12. Additionally, the overall system can use non-volatile storage devices on the microcontroller 300 to save device states from the host systems before returning control to the operating system 200. Finally, preventing the continued operation of the microcontroller 300 when the host system is in a low power mode enhances system "coherency." The ability to resume subsequently from a known state is enhanced, since the microcontroller 300 cannot have altered the state while the host processor 30 was in the low power mode. Additional processes can be run for shutting down the system when some of the device-saving routines can be off-loaded to a processor on the microcontroller 300.

Legacy (i.e., non-ACPI) operations are also supported. The ACPI specification requires the BIOS 216 to determine whether the operating system is ACPI-compliant by checking whether system control interrupts are enabled, as indicated by a nonvolatile SCI_EN bit. Because SCI events are available only in ACPI operating environments, ACPI-compliant hardware platforms automatically map SCI events to system management interrupt (SMI) events readable by BIOS 216. Because legacy operating systems run on ACPI-compliant hardware in which SCI events are mapped to SMI events, the PM1b control register 312 remains accessible even to the legacy operating systems. Consequently, the embedded controller 300 can "wake" the host processor 30 and can exchange information with secondary processors on the host system, even while the primary host processor 30 is in a low-power mode.

When the host processor 30 enters a low-power mode, including a sleep state, the computer system BIOS traps the corresponding access to the PM1a control register 310. The present invention then invokes a method on the host system which exchanges information between the host and embedded processors. The present invention determines that the power-management register access is to reduce power in the host system. The present invention also ensures that, in mapping SCI events to SMI events, the ACPI operating system shut-down procedures allow the microcontroller 300 to wake the host system even if a legacy operating system is all that is available on re-boot.

With the present invention, it can be seen that synchronization is achieved between the main processor 30 and the embedded microcontroller 300 during transition to a low power state. In addition, the ACPI BIOS 210 is able to save the status of those non-ACPI compliant portion of the computer system S before returning control to the operating system. The microcontroller 300 is able to either shut down completely or go to a low power mode before such a return occurs. Thus, when the system S is returned to a wake state, it returns to a known state during the resume process.

The foregoing disclosure and description of the invention are illustrative and explanatory thereof, and various changes in number of variables, number of parameters, order of steps, field sizes, data types, code elements, code size, connections, components, and materials, as well as in the details of the illustrated hardware and software and construction and method of operation may be made without departing from the spirit of the invention.

What is claimed is:

1. A computer system comprising:
   a processor under control of an operating system and a basic input/output system (BIOS), the processor having a plurality of processor power states;
   a microcontroller, the microcontroller having a plurality of microcontroller power states; and
   a memory device storing the BIOS for the processor, the BIOS comprising:

code to receive a request to transition the processor to a different one of the plurality of processor power states;

code to notify the microcontroller of the request;

code to receive an acknowledgment of the request from the microcontroller; and code to cause the processor to transition to the different one of the plurality of power states responsive to the acknowledgment.

2. The computer system of claim 1, the microcontroller adapted to transition to a different power state of the plurality of microcontroller power states corresponding to the different one of the plurality of processor power states responsive to the code to notify the microcontroller.

3. The computer system of claim 1, wherein the processor and its operating system are effectively compliant with the Advanced Configuration and Power Interface (ACPI) specification and the microcontroller is not compliant with the ACPI specification.

4. The computer system of claim 1, further comprising:

at least one peripheral device operating under control of the operating system; the BIOS further comprising:

code to notify the peripheral device to perform a custodial function responsive to the request.

5. The computer system of claim 1, further comprising:

a first power management control register adapted to store the current power state of the processor; and a second power management control register adapted to store the current power state of the microcontroller.

6. computer system comprising:

a processor under control of an operating system and a basic input/output system (BIOS), the processor having a plurality of processor power states;

at least one peripheral device operating under control of the operating system;

a memory device storing the BIOS for the processor, the BIOS comprising:

code to receive a request to transition the processor to a different one of the plurality of processor power states; and code to notify the peripheral device to perform a custodial function responsive to the request.

7. The computer system of claim 6, further comprising:

a microcontroller coupled to the processor, the microcontroller adapted to perform the custodial function responsive to the code to notify the peripheral device.

8. The computer system of claim 7, wherein the microcontroller is wake-enabled, and wherein the custodial function comprises:

enabling the wake-enabled microcontroller.

9. The computer system of claim 6, wherein the custodial function comprises:

storing data.

10. The computer system of claim 6, wherein the custodial function comprises:

storing clock.

11. The computer system of claim 6, wherein the custodial function comprises:

unloading applications.

12. The computer system of claim 6, wherein the custodial function comprises:

closing files.

13. A method of synchronizing power states in a computer system having a microcontroller and a processor under control of an operating system and a basic input/output system (BIOS), the processor having a plurality of processor power states, the microcontroller having a plurality of microcontroller power states, a method comprising the steps of:

detecting a command to transition the processor to a different one of the plurality of processor power states;

notifying the microcontroller of the command; and transitioning the microcontroller to a different one of the plurality of microcontroller power states corresponding to the different one of the plurality of processor power states.

14. The method of claim 13, wherein the computer system has at least one peripheral device, the method further comprising the step of:

notifying the peripheral device to perform a custodial function.

15. In a computer system having a microcontroller and a processor under control of an operating system and a basic input/output system (BIOS), the processor having a plurality of processor power states, the microcontroller having a plurality of microcontroller power states, a memory device containing BIOS code causing the computer system to perform the steps of:

detecting a command to transition the processor to a different one of the plurality of processor power states;

notifying the microcontroller of the command; and transitioning the processor to the different one of the plurality of processor power states responsive to an acknowledgment by the microcontroller to the step of notifying the microcontroller.

16. The memory device of claim 15, wherein the memory device further contains BIOS code causing the computer system to perform the step of:

transitioning the microcontroller to a different one of the plurality of microcontroller power states corresponding to the different one of the plurality of processor power states.

17. The memory device of claim 16, the step of transitioning the microcontroller comprising the step of:

shutting down the microcontroller.

18. The memory device of claim 15, wherein the computer system includes at least one peripheral device, and wherein the memory device further contains BIOS code causing the computer system to perform the step of:

notifying the peripheral device to perform a custodial function.

\* \* \* \* \*

UNITED STATES PATENT AND TRADEMARK OFFICE
CERTIFICATE OF CORRECTION

PATENT NO.    : 6,405,320 B1
DATED         : June 11, 2002
INVENTOR(S)   : Woon Jeong Lee et al.

It is certified that error appears in the above-identified patent and that said Letters Patent is hereby corrected as shown below:

Column 7,
Line 38, "Each of the" should start a new paragraph.

Column 11,
Line 31, before "computer system" insert -- A --.

Signed and Sealed this

Twentieth Day of December, 2005

JON W. DUDAS
*Director of the United States Patent and Trademark Office*